United States Patent

[11] 3,589,504

| [72] | Inventor | Ronald S. Blough<br>Fairfield, Iowa |
|---|---|---|
| [21] | Appl. No. | 795,533 |
| [22] | Filed | Jan. 31, 1969 |
| [45] | Patented | June 29, 1971 |
| [73] | Assignee | Fairfield Engineering and Manufacturing Co.<br>Fairfield, Iowa |

[54] TORQUE LIMITING MEANS FOR CONVEYORS
8 Claims, 5 Drawing Figs.

[52] U.S. Cl. ..................................... 198/232, 318/475
[51] Int. Cl. ....................................... B65g 43/02, H02h 7/08
[50] Field of Search ........................................ 198/40, 232; 318/475, 476; 119/51.11

[56] References Cited

UNITED STATES PATENTS

| 3,157,157 | 11/1964 | Clay | 119/51.11 |
| 3,295,500 | 1/1967 | Blough | 119/51.11 X |
| 1,938,720 | 12/1933 | Preble | 318/475 X |
| 2,387,047 | 10/1945 | Weiss | 318/475 X |
| 2,387,533 | 10/1945 | Schmucker | 318/475 X |
| 3,238,436 | 3/1966 | Carter | 318/475 |

*Primary Examiner*—Edward A. Sroka
*Attorney*—Wolfe, Hubbard, Leydig, Voit & Osann

ABSTRACT: A chain conveyor operating in a conveyor housing is driven by a rotatably mounted drive motor to exert a counter rotational reaction torque against a resilient stop element. When the reaction torque exceeds a preselected value, compression of the stop element trips a motor cutoff switch to stop the conveyor, which remains stopped until the switch is manually reset.

PATENTED JUN 29 1971
3,589,504
SHEET 1 OF 3
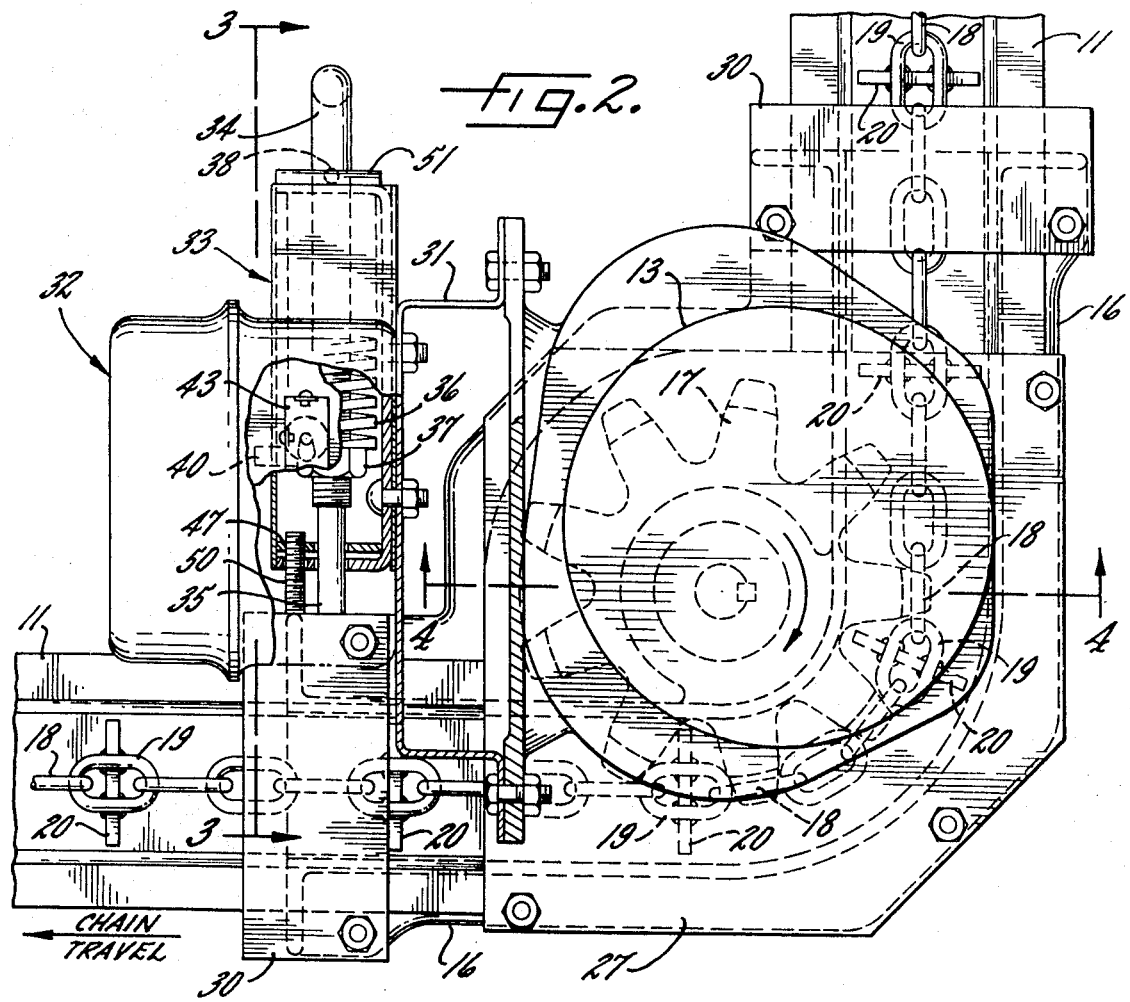
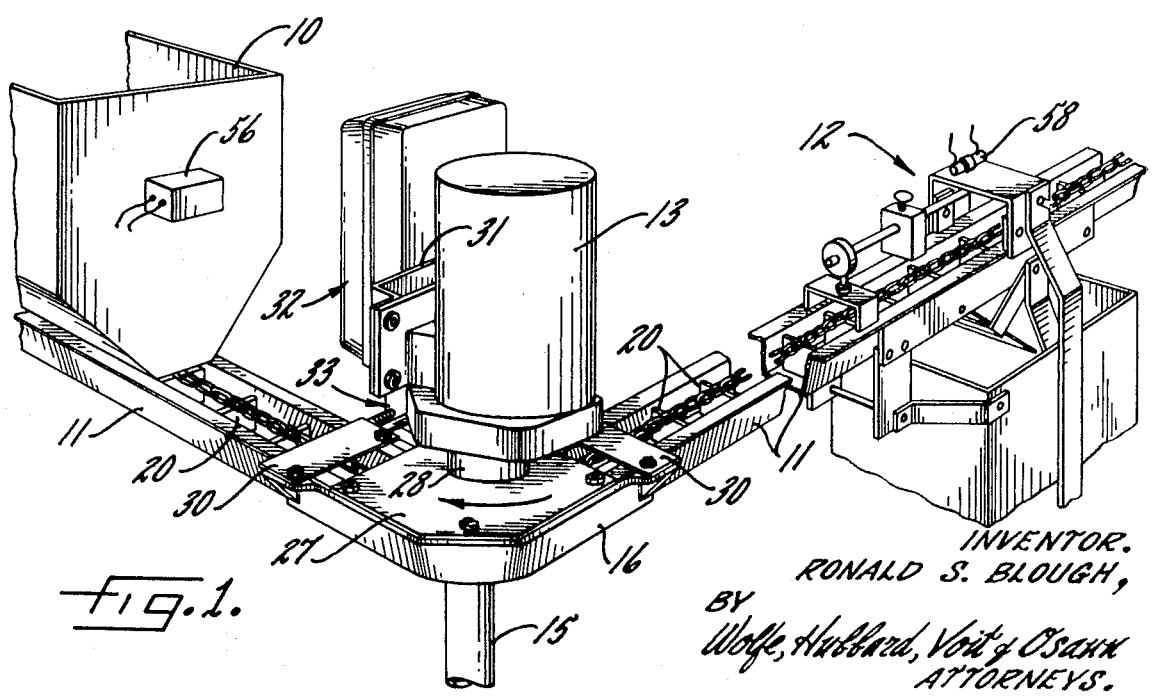
INVENTOR.
RONALD S. BLOUGH,
BY Wolfe, Hubbard, Voit & Osann
ATTORNEYS.

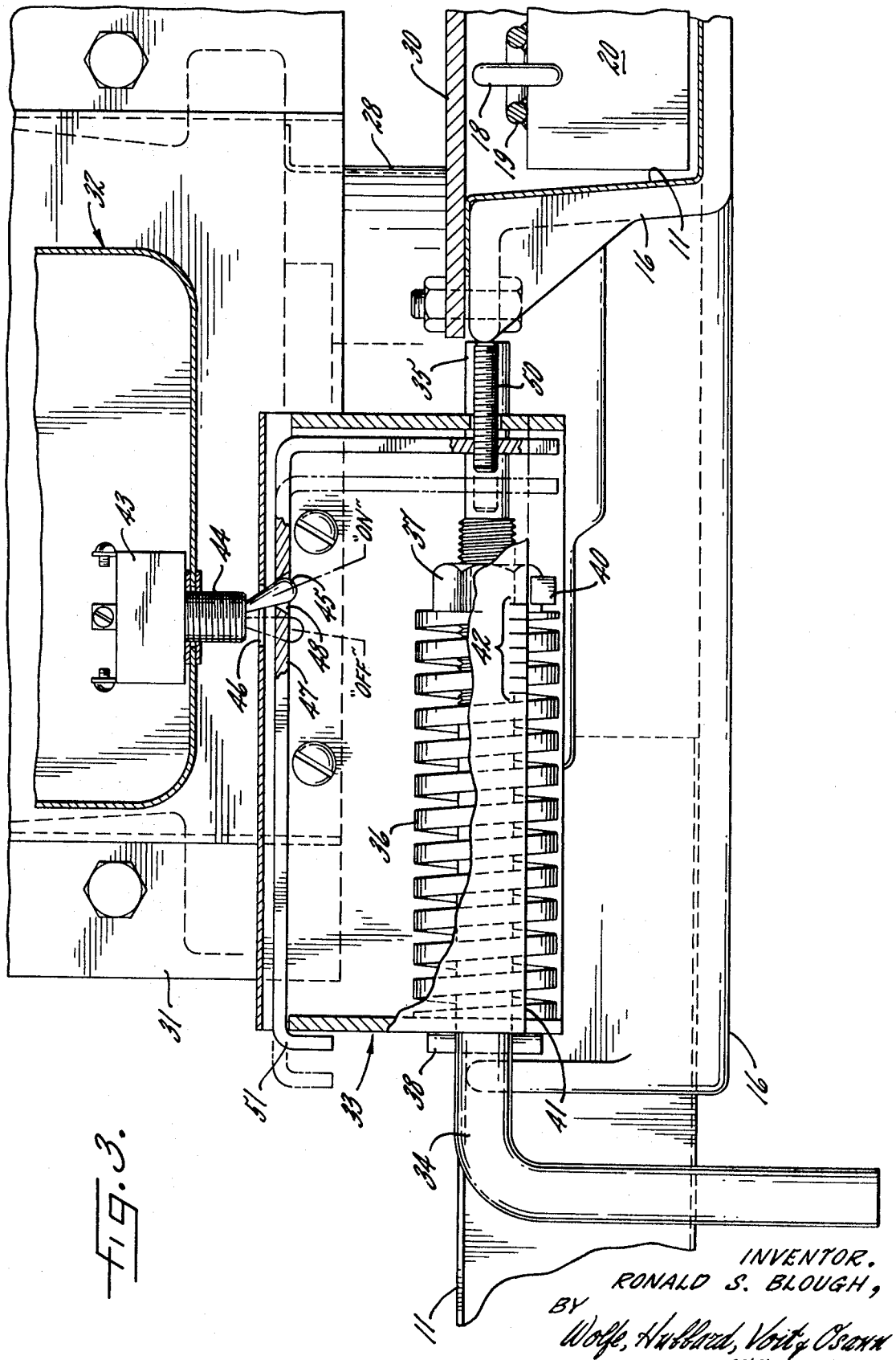

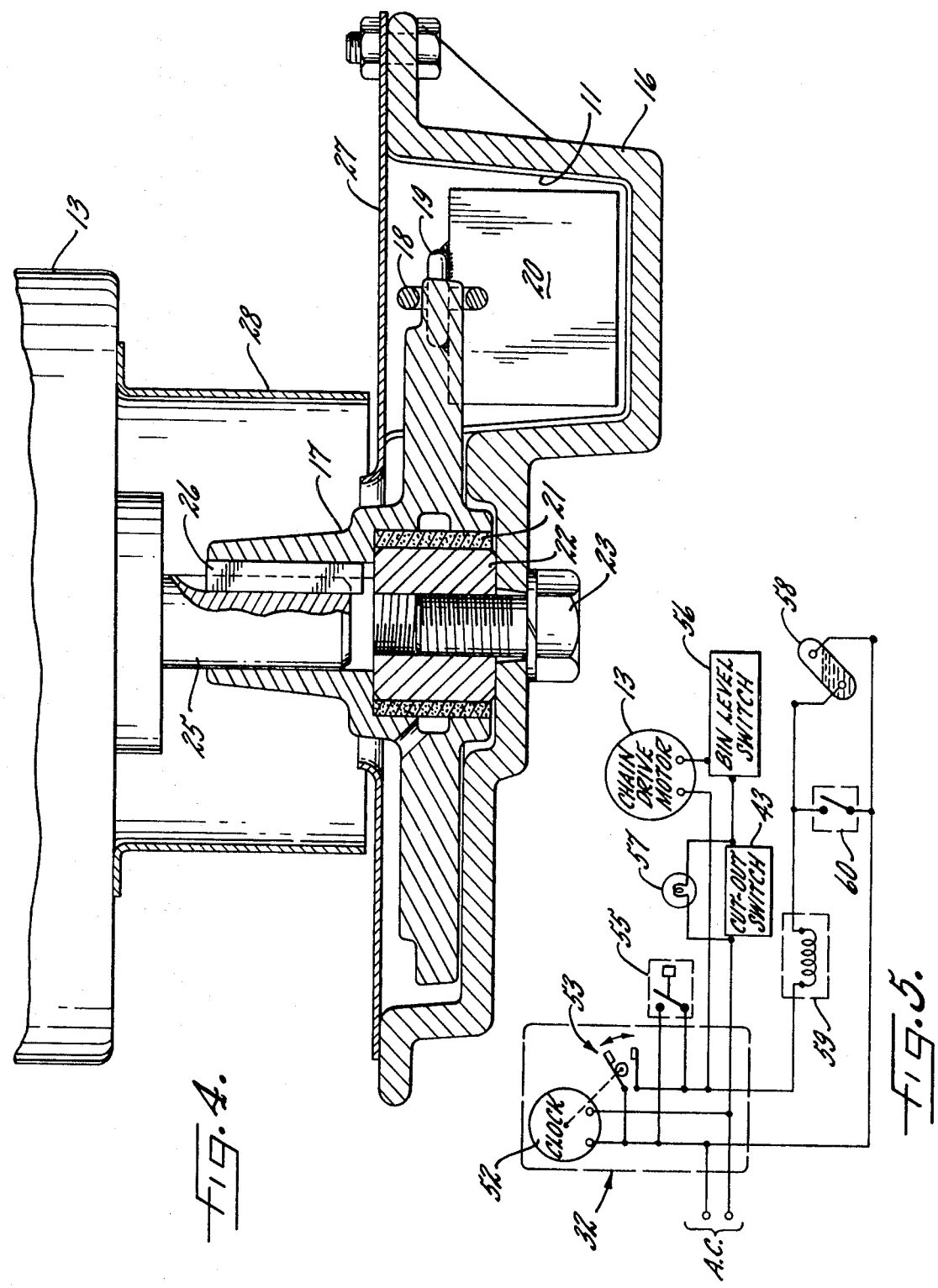

3,589,504

TORQUE LIMITING MEANS FOR CONVEYORS

DESCRIPTION OF THE INVENTION

The present invention relates to automatic livestock feeding systems, and in particular to an overload trip device for deenergizing a chain conveyor motor when an obstruction is encountered within the conveyor system.

A principal object of the invention is to provide a mechanical overload trip means for deenergizing a conveyor drive motor when an excessive conveyor load is encountered. It is intended that the device be inexpensively fabricated of easily available parts as well as simple and reliable in operation.

A further object is to provide means for keeping the conveyor motor deenergized after having encountered an excessive load until manually reset by the operator. In addition, it is intended to provide a visual signal remote from the conveyor unit for indicating that an overload has tripped the system and calling the attention of the operator to the malfunction.

Other objects and advantages of the invention will become apparent from reading the following specification and by reference to the drawings, in which:

FIG. 1 is a perspective of a portion of an exemplary livestock feeding system embodying the present invention;

FIG. 2 is a plan view in partial section of one corner of the conveyor system incorporating the conveyor drive motor and overload trip device;

FIG. 3 is an enlarged fragmentary section taken in plane 3-3 of FIG. 2;

FIG. 4 is an enlarged fragmentary section taken in the plane 4-4 of FIG. 2; and

FIG. 5 is a schematic circuit diagram of the control circuit employed in the overload trip means.

While the invention is described in connection with a particular preferred embodiment, it will be understood that the scope and applicability of the invention is not limited to the particular construction shown, but is equally useful in other conveyor applications in which an inexpensive and reliable mechanical overload trip device is required.

Turning to the drawings, there is shown in FIG. 1 a portion of an automatic weighing and distributing apparatus for feeding livestock. The function of this apparatus is to distribute livestock feed from a large storage bin 10 by means of a chain conveyor 11 to individual weighing and distributing boxes 12. The conveyor 11 defines a continuous loop generally disposed on a horizontal plane with the weighing and distributing units 12 situated at spaced intervals at each livestock feeding station. In operation, feed is transferred from the bin 10 into the conveyor 11 and is carried around the conveyor loop to each of the individual weighing and distributing boxes 12 until each box is filled to a predetermined point, at which time it automatically ceases to fill and deposits its contents into a feeding bunker or trough. After each box 12 has filled to its capacity and tripped, it receives no more feed until the system is reset for the next feeding cycle. This exemplary livestock feeding system is described in complete particularity in my U.S. Pat. Nos. 3,185,230, "Apparatus for Automatic Weighing and Distributing Feed for Livestock," and 3,295,500, "Automatic Feed Weighing and Distributing Apparatus for Livestock."

Variations of the foregoing system are also described in these patents including means for adding liquid to the feed as it is distributed and means for causing all the boxes 12 to dump their contents simultaneously rather than in sequence as they are filled. However, this structure forms no part of the present invention and will need not be described further here.

As best seen in FIGS. 1 and 2, the conveyor 11 is powered by a motor 13 located at one corner of the conveyor structure which is supported on a stanchion 15. This structure includes a corner housing 16, preferably of cast metal, in which a drive sprocket 17 is journaled for rotational engagement with a conveyor chain. The sprocket 17 engages individual alternate links 18 of the chain, with the adjacent links 19 carrying conveyor plates 20 which are dragged along the conveyor flight 11 to pull feed from the bin 10 to each of the individual weighing boxes 12. The plates 20 are welded to the links 19, which in conjunction with the connecting links 18 make up an endless articulated drag conveyor which is propelled along the entire length of its flight by the motor 13 and sprocket 17.

The journal for the sprocket 17 (FIG. 4) consists of a bushing 21 and bushing support 22 secured to the corner housing 16 by a bolt 23. At its upper end, the sprocket 17 has a hollow extension with a bore and keyway for receiving the motor output shaft 25 and a key 26. The corner housing 16 is covered by a protective sheet metal plate 27, and the rotating sprocket 17 and motor shaft 25 are protected by a cylindrical shroud 28. Auxiliary stiffening plates 30 are located at widened end portions of the corner housing 16 to furnish additional rigidity.

As a principal feature of the invention, overload protection means are provided in connection with the mounting of the drive motor 13 so that an excessive drive load at any point along the conveyor 11 will deenergize the motor 13 and stop the conveyor. This feature is important because in normal operation it is not uncommon for stones, bolts, pieces of broken conveyor flight and other foreign objects to become mixed with the feed and jam or otherwise impede the progress of the conveyor 11. This is particularly true where the conveyor must turn a corner where other sprockets (not shown) are employed to enable the conveyor chain to change direction as it completes its loop path.

To accomplish the foregoing objective, the motor 13 is rotatably carried above the corner housing 16 in relation to the drive sprocket 17. As best seen in FIG. 4, there is no rigid mechanical connection between the outer casing of the motor 13 and the corner housing casing 16, with the motor 13 and protected shroud 28 being freely rotatable with respect to the entire corner structure. To resist the counterrotational driving reaction torque of the motor 13 there is provided a laterally extending support bracket 31 to which is attached a housing 32 containing a timeclock and other control apparatus (which are described hereafter in connection with FIG. 5) and a depending plunger housing 33 having a resiliently mounted plunger 34 which abuts at its tip 35 against the edge of the corner housing 16. It can be seen that as the drive motor 13 rotates the drive sprocket 17 in a clockwise direction (as seen in FIG. 2) the drive reaction torque will be applied to the tip 35 of the plunger 34, forcing it against the edge of the corner housing 16. This reaction force is at all times proportional to the driving torque exerted by the motor 13 through the sprocket 17. If a jam or stoppage should occur at any point in the conveyor 11, this reaction torque will increase in proportion to the increased force required to move the chain and furnish an indication of the malfunction.

To deenergize the motor 13 in response to excessive reaction torque, the plunger 34 is resiliently supported within the plunger housing 33 by a spiral compression spring 36 which bears against a stop nut 37 threaded to the plunger 34. At its opposite end, the spring 36 bears against the rear of the plunger housing 33 which forms a collar about the plunger 34. The plunger 34 is restrained against movement toward the corner housing 16 by a cross pin 38 located exteriorly of the housing 33 in a manner which retains the spring 36 in a predetermined state of compression which is adjustable by varying the position of the stop nut 37. A 90° bend is provided on the protruding end of the plunger 34 to serve as a handle whereby the plunger may be rotated, and the stop nut 37 is captively retained within the plunger housing 33 by a welded-on dog 40 to prevent it from turning as the plunger 34 is rotated to adjust the spring tension.

Further in accordance with the invention, the dog 40 extends exteriorly of the plunger housing 33 through a longitudinal slot 41 and a row of inscribed indicia 42 are placed thereon to act as a visual indicator means to show the position of the dog 40 and thus the amount of precompression of the spring 36.

The cutoff function for the motor 13 when excessive reaction torque is encountered is accomplished through a cutoff toggle switch 43 carried by the control housing 32 (FIG. 3). The switch 43 is secured to the control housing 32 by its threaded shaft 44 and has a protruding toggle lever 45. The toggle lever 45 extends through a relatively large diameter opening 46 in the plunger housing 33 which allows the lever to freely swing between its alternate "off" and "on" positions. To actuate the switch 43, there is located within the plunger housing 33 a switch actuating linkage means 47 having a small beveled opening 48 within which the toggle lever 45 is engaged, and an adjustable threaded stop 50 at one end adjacent the contact portion 35 of the plunger 34. The stop 50 also abuts against the conveyor corner housing 16. At the opposite end of the actuating member 47 is a manually operable extension 51 by which the unit can be reset after it has been tripped.

In operation, spring tension is set by rotating the handle of the plunger 34 until the dog 40 on the stop nut 37 is positioned with respect to the indicia 42 at a point indicating the desired predetermined limiting torque at which the cutoff switch 43 will be tripped to deenergize the motor 13. In practice it has been found that this setting should represent the normal operating torque encountered during proper operation plus 20 percent. With a 400 foot conveyor chain moving normally at a rate of 15 feet per minute, it has been found that the speed of the sprocket 17 is 12 r.p.m. and the drawing force on the chain is about 200 pounds. A ¼-horsepower motor with correct gearing force for such an installation is capable of exerting a maximum of approximately 1000 pounds and therefore the maximum practical rating for such a unit is reasonably in the neighborhood of 700 pounds, which is sufficient to cause considerable damage if the conveyor should jam. With the 200 pound normal pull experienced during normal operation plus the 20 percent overload factor, the torque limiting unit should therefore trip out upon encountering a pull of 240 pounds.

Since the axis of rotation of the entire drive unit assembly including the motor 13 is the same as that of the drive sprocket 17, the force exerted at the tip 35 of the plunger 34 will then be equal to 240 pounds times the lever ratio of the drive sprocket radius and the distance of the plunger tip 35 from the drive sprocket centerline. If this ratio is 2:1, as in the present illustration, the force at the plunger tip 35 will be 120 pounds. The preload of the spring 36 is therefore set to 120 pounds compression by rotating the plunger 34 until the position of the dog 40 against the indicia scale 42 indicates that this has been accomplished. Preferably, the indicia 42 are calibrated in terms of the draw force on the chain rather than the actual compression of the spring 36, as it is the former which is of principal interest.

If the conveyor chain should become jammed, then the reaction torque applied through the plunger housing 33 will first equal and then exceed the preload compression of the spring 36, causing the plunger housing 33 to shift towards the corner housing 16 while the plunger 34 remains stationary. Since the stop pin 50 on the switch actuating member 47 also remains stationary, it can be seen that the entire motor assembly including the plunger housing 33 and cutoff switch 43 shifts slightly to the right as viewed in FIG. 3, tripping the toggle lever 45 to the left against the immobile actuating member 47. The motor 13 is thereby deenergized, stopping the chain and preventing damage to the conveyor system.

As a further feature of the invention, the cutoff switch 43 will remain in the "off" position after the obstruction has been cleared and the motor assembly has been returned to its normal operating position through the action of the spring 36 in shifting the plunger 34 back to its position as limited by the stop 38. The movement of the plunger housing 33 in returning to this position does not affect the position of the switch actuating member 47 because the latter is unrestrained in its movement leftward with respect to the plunger housing 33 (FIG. 3) and remains in the position shown in phantom lines. The adjustable pin 50 of the switch actuating member 47 also remains spaced from the corner housing 16 until manually returned by the operator.

When it is desired to restart the mechanism, the operator determines that the conveyor is clear, and then simply grasps the extension 51 of the switch actuating member 47 and pushes it inward, thereby moving the toggle lever 45 of the cutoff switch 43 to the "on" position and shifting the threaded pin 50 back into contact with the corner housing 16 as before. In this position the unit is fully reset and will continue to run normally.

As shown in FIG. 5, normal operation of the conveyor system is by a timeclock 52 controlling a pair of switch contacts 53 to begin the energization cycle of the chain drive motor 13. The entire operation is controlled through a manual starting switch 55, preferably of the pushbutton type. Power to the chain drive motor is supplied through the cutout switch 43 and a bin level switch 56 arranged in series. The latter switch assures that the unit will not run when the level of feed in the bin 10 is insufficient to adequately supply the feeding requirements. As previously described, opening the cutout switch 43 stops power to the drive motor 13 until reset by the operator through the extension 51 of the switch actuating member 47.

As a further feature of the invention, a visible warning light is provided which can be placed on a control panel or elsewhere to indicate that the conveyor drive motor 13 has been cut out due to a malfunction. For furnishing a visual indication, an indicator lamp 57 is connected in parallel with the cutout switch 43. Should the latter switch open, voltage applied to the drive motor 13 will appear across the cutout switch 43. The small amount of current necessary to illuminate the warning lamp 57 will not be sufficient to energize the motor 13. A similar warning lamp (not shown) can also be disposed across the bin level switch 56, if desired, or a single combined warning lamp can be connected across both switches to indicate either a malfunction or a deficiency of feed in the bin 10.

In the remaining portions of the circuit of FIG. 5, a mercury switch 58 and a solenoid 59 are shown operably connected to a holding switch 60. These elements are used in connection with each of the individual weighing boxes 12 in a manner described in my previously mentioned patents, and serve to indicate when the individual weighing boxes 12 are full and then actuate a resetting mechanism to make each box ready for the next filling cycle.

In operation, the mercury switch 58 is connected to a tippable portion of the weighing box 12 so that when it has filled to the desired weight, a balance member tips up and opens the contacts of the mercury switch 58, deenergizing the solenoid 59 and allowing a chain hook (not shown) to drop onto the chain and to be drawn forward in a manner which resets the weighing boxes 12 through suitable linkage (not shown). This and other details of this aspect of the subject mechanism are fully described in my U.S. Pat. Nos. 3,185,230 and 3,295,500 previously mentioned.

The following I claim as invention:

1. An overload protection system for a conveyor having a chain slidably supported within a conveyor housing, comprising in combination:

a drive sprocket substantially vertically journaled on said conveyor housing in driving engagement with said chain;

a drive motor having a substantially vertical output shaft coupled to said sprocket, said motor being supported by said sprocket and rotatable relative to said housing;

means for resiliently resisting said motor rotation caused by reaction torque resulting from said motor driving said sprocket and chain in a forward direction, said means being operably connected to said motor and contacting said housing;

a motor cutoff switch mounted on said motor;

linkage means for actuating said cutoff switch responsive to deflection of the resilient resisting means exceeding a predetermined value, said linkage means being carried by said motor and contacting said housing; and automatic switching means connected in series with the motor cutoff switch for periodically energizing said motor.

2. Apparatus as defined in claim 1 in which said biasing means includes a preloaded compression spring interposed between a nut and a collar on a threaded plunger, means for preventing rotation of the nut as the plunger is turned to vary the amount of spring preload, and indicator means for furnishing a visual indication of the amount of spring preload.

3. Apparatus as defined in claim 1 in which said linkage means includes a manually operable switch actuating member engageable with said drive motor and conveyor housing for shifting movement in one direction to automatically actuate said cutoff switch in response to drive motor reaction torque greater than said preselected value, and which is unrestrained for shifting movement in the opposite direction upon the removal of said torque to allow said cutoff switch to be manually reset.

4. Apparatus as defined in claim 1 including a remote warning lamp connected in parallel across said cutoff switch.

5. Apparatus as defined in claim 1 wherein said drive sprocket is journaled on an element forming a corner of the conveyor housing and the chain is pulled and guided around the corner by the sprocket.

6. Apparatus as defined in claim 5 wherein said drive motor is journaled for rotation on said corner element above said drive sprocket.

7. Apparatus as defined in claim 1 wherein said automatic switching means includes an electric timeclock for energizing the motor at predetermined intervals.

8. Apparatus as defined in claim 1 wherein said automatic switching means includes a bin level switch connected in series with the cutoff switch.